(12) United States Patent
Ma et al.

(10) Patent No.: US 11,631,914 B2
(45) Date of Patent: Apr. 18, 2023

(54) SOLID ELECTROLYTE, PREPARATION METHOD THEREOF, LITHIUM AIR BATTERY INCLUDING THE SAME, AND ELECTROCHEMICAL DEVICE INCLUDING THE SAME

(71) Applicant: Samsung Electronics Co., Ltd., Suwon-si (KR)

(72) Inventors: Sangbok Ma, Suwon-si (KR); Donghwa Seo, Burlington, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 191 days.

(21) Appl. No.: 17/104,286

(22) Filed: Nov. 25, 2020

(65) Prior Publication Data
US 2021/0167447 A1 Jun. 3, 2021

Related U.S. Application Data

(60) Provisional application No. 62/941,931, filed on Nov. 29, 2019.

(30) Foreign Application Priority Data

Feb. 20, 2020 (KR) ........................ 10-2020-0021112

(51) Int. Cl.
*H01M 12/02* (2006.01)
*H01M 12/08* (2006.01)
*H01G 11/56* (2013.01)
*C01G 35/00* (2006.01)
*C01F 7/043* (2022.01)
(Continued)

(52) U.S. Cl.
CPC ............. *H01M 12/02* (2013.01); *C01F 7/043* (2013.01); *C01F 7/162* (2013.01); *C01G 9/006* (2013.01); *C01G 27/006* (2013.01); *C01G 35/006* (2013.01); *H01G 11/56* (2013.01); *H01M 12/08* (2013.01); *C01P 2002/54* (2013.01); *C01P 2002/72* (2013.01); *C01P 2002/76* (2013.01);
(Continued)

(58) Field of Classification Search
CPC ............ H01M 2300/0071; C01F 7/043; C01G 9/006; C01G 27/006; C01G 35/006
See application file for complete search history.

(56) References Cited

U.S. PATENT DOCUMENTS

2011/0039162 A1   2/2011 Maeda
2019/0334201 A1*  10/2019 Senoue ............ H01M 10/0562
(Continued)

FOREIGN PATENT DOCUMENTS

KR   1020110016378 A   2/2011
KR      101508423 B1   4/2015

*Primary Examiner* — Brittany L Raymond
(74) *Attorney, Agent, or Firm* — Cantor Colburn LLP

(57) ABSTRACT

A solid electrolyte includes an ion conductor represented by at least one of Formulae 1 to 3, $$Li_{1+3x}M1_{1-x}O_2 \qquad \text{Formula 1}$$

wherein, in Formula 1,
M1 is a trivalent element, and 0<x<1, $$Li_{1-y}M2O_{2-y}X_y \qquad \text{Formula 2}$$

wherein, in Formula 2,
M2 is a trivalent element,
X is at least one of a halogen atom or a pseudohalogen, and 0<y<1, $$Li_{1-z(a-3)}M3_{1-z}D_zO_2 \qquad \text{Formula 3}$$

wherein, in Formula 3,
M3 is a trivalent element,
(Continued)

D is at least one of a monovalent element to a hexavalent element, and $0<z<1$.

21 Claims, 4 Drawing Sheets

(51) Int. Cl.
*C01G 9/00* (2006.01)
*C01F 7/162* (2022.01)
*C01G 27/00* (2006.01)

(52) U.S. Cl.
CPC ...... *C01P 2002/77* (2013.01); *C01P 2006/40* (2013.01); *H01M 2300/0071* (2013.01)

(56) References Cited

U.S. PATENT DOCUMENTS

2019/0356016 A1* 11/2019 Wang .................. C01G 27/006
2019/0356019 A1* 11/2019 Mimura ............ H01M 10/4235

* cited by examiner

SOLID ELECTROLYTE, PREPARATION METHOD THEREOF, LITHIUM AIR BATTERY INCLUDING THE SAME, AND ELECTROCHEMICAL DEVICE INCLUDING THE SAME

CROSS-REFERENCE TO RELATED APPLICATIONS

This application claims priority to and the benefits of U.S. Provisional Patent Application No. 62/941,931, filed on Nov. 29, 2019, in the U.S. Patent and Trademark Office, and Korean Patent Application No. 10-2020-0021112, filed on Feb. 20, 2020, in the Korean Intellectual Property Office, and all the benefits accruing therefrom under 35 U.S.C. § 119, the contents of which are incorporated herein in their entireties by reference.

BACKGROUND

1. Field

The present disclosure relates to a solid electrolyte, a preparation method thereof, a lithium air battery including the solid electrolyte, and an electrochemical device including the solid electrolyte.

2. Description of the Related Art

A lithium air battery uses lithium itself as an anode, and there is no need to store air as a cathode active material in the battery. Therefore, a lithium air battery may function as a high-capacity battery. The theoretical specific energy of a lithium air battery is 3500 Wh/kg or more, which is very high.

However, the solid electrolyte of a lithium air battery is not stable in the presence of a strong base such as lithium hydroxide, which is a discharge product of a lithium air battery, and the ion conductivity of the solid electrolyte deteriorates under the condition of a strong base such as lithium hydroxide. Thus an improved solid electrolyte is needed.

SUMMARY

Provided is a solid electrolyte having improved ion conductivity, and a preparation method thereof.

Provided is a lithium air battery including the solid electrolyte.

Provided is an electrochemical device including the solid electrolyte.

Additional aspects will be set forth in part in the description which follows and, in part, will be apparent from the description.

According to an aspect, a solid electrolyte includes:
an ion conductor represented by at least one of Formulae 1 to 3, $$Li_{1+3x}M1_{1-x}O_2 \quad \text{Formula 1}$$

wherein, in Formula 1,
M1 is a trivalent element, and $0<x<1$, $$Li_{1-y}M2O_{2-y}X_y \quad \text{Formula 2}$$

wherein, in Formula 2,
M2 is a trivalent element,
X is at least one of a halogen atom or a pseudohalogen, and $0<y<1$, $$Li_{1-z(a-3)}M3_{1-z}D_zO_2 \quad \text{Formula 3}$$

wherein, in Formula 3,
M3 is a trivalent element,
D is at least one of a monovalent element to a hexavalent element,
a is an oxidation number of D, and $0<z<1$.

According to an aspect, a lithium air battery includes: a cathode; an anode; and an electrolyte between the cathode and the anode, wherein the electrolyte includes a solid electrolyte, and wherein the solid electrolyte includes an ion conductor represented by at least one of Formulae 1 to 3.

According to an aspect, an electrochemical device includes: a cathode; and anode; and an electrolyte between the cathode and the anode, wherein at least one of the cathode, the anode, and the electrode includes a solid electrolyte, wherein the solid electrolyte includes an ion conductor represented by at least one of Formulae 1 to 3, $$Li_{1+3x}M1_{1-x}O_2 \quad \text{Formula 1}$$

wherein, in Formula 1,
M1 is a trivalent element, and $0<x<1$, $$Li_{1-y}M2O_{2-y}X_y \quad \text{Formula 2}$$

wherein, in Formula 2,
M2 is a trivalent element,
X is at least one of a halogen atom or a pseudohalogen, and $0<y<1$, $$Li_{1-z(a-3)}M3_{1-z}D_zO_2 \quad \text{Formula 3}$$

wherein, in Formula 3,
M3 is a trivalent element,
D is at least one of a monovalent element to a hexavalent element,
a is an oxidation number of D, and $0<z<1$.

The electrochemical device may include at least one of a battery, an accumulator, a supercapacitor, a fuel cell, a sensor, or an electrochromic device.

According to an aspect, a method of preparing a solid electrolyte includes:
mixing a lithium precursor, at least one of an M1 precursor, an M2 precursor, or an M3 precursor, and optionally at least one of an X precursor or a D precursor to prepare a precursor mixture; and
heat-treating the precursor mixture,
wherein the solid electrolyte includes an ion conductor represented by at least one of Formulae 1 to 3, $$Li_{1+3x}M1_{1-x}O_2 \quad \text{Formula 1}$$

wherein, in Formula 1,
M1 is a trivalent element, and $0<x<1$, $$Li_{1-y}M2O_{2-y}X_y \quad \text{Formula 2}$$

wherein, in Formula 2,
M2 is a trivalent element,
X is at least one of a halogen atom or a pseudohalogen, and $0<y<1$, $$Li_{1-z(a-3)}M3_{1-z}D_zO_2 \quad \text{Formula 3}$$

wherein, in Formula 3,
M3 is a trivalent element,
D is at least one of a monovalent element to a hexavalent element,
a is an oxidation number of D, and $0<z<1$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
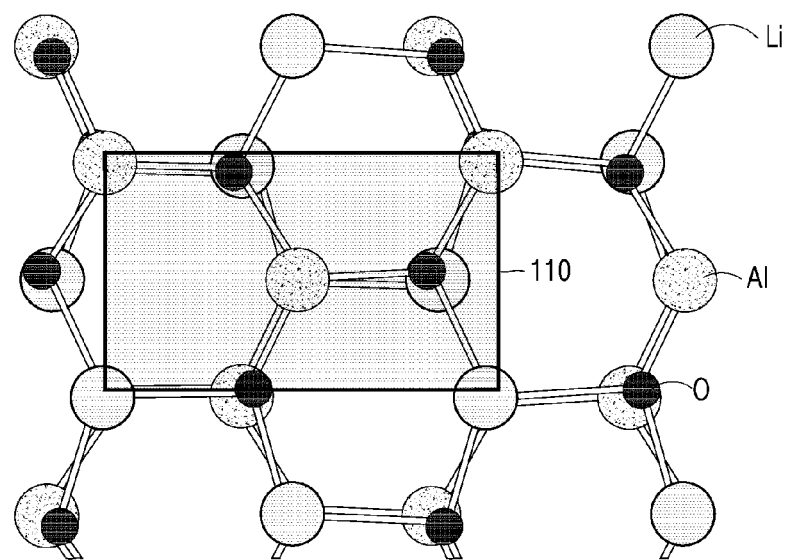
FIG. 1 is a schematic view illustrating a crystal structure of an embodiment of an ion conductor of a solid electrolyte.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, a slant "/," for example in the term "and/or," indicates that any and all combinations of one or more of the associated listed items may be present.

The present inventive concept will now be described more fully with reference to the accompanying drawings, in which example embodiments are illustrated. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. Throughout the written description and drawings, when an element such as a layer, a film, a region or a component is referred to as being "on" another layer or element, it can be "directly on" the other layer or element, or intervening layers, regions, or components may also be present. Although the terms "first," "second," "third," etc., may be used herein to describe various elements, components, regions, and/or layers, these elements, components, regions, and/or layers should not be limited by these terms. These terms are used only to distinguish one component from another, not for purposes of limitation.

The terminology used herein is for the purpose of describing particular embodiments only and is not intended to be limiting. "Or" means "and/or." The term "and/or" as used herein means that it may include one or more of one or more related list items.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Alternatively, it will be further understood that the terms will not be interpreted in an idealized or overly formal sense unless expressly so defined herein.

Exemplary embodiments are described herein with reference to cross-sectional views that are schematic illustrations of ideal embodiments. As such, variations from the shape of the illustration as a result of, for example, manufacturing techniques and/or tolerances should be expected. Accordingly, the embodiments described herein should not be construed as limited to specific shapes of regions as illustrated herein, but should include variations in shapes resulting from, for example, manufacturing. For example, regions depicted as flat may typically have rough and/or non-linear features. Moreover, the sharp angles illustrated may be rounded. Accordingly, the regions shown in the figures are schematic in nature, and their shapes are not intended to illustrate the precise shapes of the regions, and are not intended to limit the scope of the claims.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

As used herein, the term "pseudohalogen" refers to a molecule or group including two or more electronegative atoms, which in the free state show properties similar to halogens. The pseudohalogen generates anions which resemble halide ions. Examples of the pseudohalogen may include cyanide (CN), cyanate (OCN), thiocyanate (SCN), azide ($N_3^-$), or a combination thereof.

As used herein, the term rare-earth element refers to any of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

As used herein, the "ion conductivity after being immersed in a saturated lithium hydroxide solution" refers to an ion conductivity after contacting a solid electrolyte with a saturated lithium hydroxide solution maintained at 40° C. for 7 days and then removing the saturated lithium hydroxide solution. The saturated lithium hydroxide solution may be removed by washing with water and then drying. For example, washing may be repeated using distilled water and drying may be performed at 120° C. for 24 hours. Appropriate ranges for the temperature of the contacting of the solid electrolyte with the saturated lithium hydroxide solution may be about 1 day to about 7 days, and appropriate ranges for time of the contacting of the solid electrolyte with the saturated lithium hydroxide solution may be about 10° C. to about 50° C.

As used herein, the "size" refers to an average diameter when particles are spherical, and refers to a major axis length when particles are non-spherical. The size may be measured using an electron scanning microscope or a particle size analyzer.

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

A NASICON compound refers to a compound that is isostructural with NASICON, which has the chemical formula $Na_{1+x}Zr_2Si_xP_{3-x}O_{12}$, wherein $0<x<3$.

Hereinafter, a solid electrolyte, a preparation method of the solid electrolyte, a metal air battery including the solid electrolyte, and an electrochemical device including the solid electrolyte will be described in further detail.

$LiAlO_2$, which is commercially available as a solid electrolyte material, has low ion conductivity, and thus development of an improved solid electrolyte material is needed.

Thus, the present inventors have surprisingly discovered a solid electrolyte that has improved ion conductivity while being thermodynamically stable. Without wishing to be bound by theory, it is understood that by introducing elemental deficiencies and/or heterogeneous elements in the solid electrolyte, a path is provided for lithium ions, which results in improved ion conductivity.

A solid electrolyte according to an embodiment includes: an ion conductor represented by at least one of Formulae 1 to 3.

$$Li_{1+3x}M1_{1-x}O_2 \quad \text{Formula 1}$$

wherein, in Formula 1, M1 is a trivalent element, and $0<x<1$.

$$Li_{1-y}M2O_{2-y}X_y \quad \text{Formula 2}$$

wherein, in Formula 2, M2 is a trivalent element, X is at least one of a halogen atom or pseudohalogen, and $0<y<1$.

$$Li_{1-z(a-3)}M3_{1-z}D_zO_2 \quad \text{Formula 3}$$

wherein, in Formula 3, M3 is a trivalent element, D is at least one of a monovalent element to a hexavalent element, a is an oxidation number of D, and $0<z<1$.

In Formulae 1 to 3, M1, M2, and M3 are each independently a trivalent cationic element, and may be, for example, at least one of aluminum (Al), gallium (Ga), indium (In), scandium (Sc), yttrium (Y), or lanthanum (La).

FIG. 1 is a schematic view showing a crystal structure of an embodiment of an ion conductor of the solid electrolyte. The ion conductor has a crystal structure that is isostructural with $LiMO_2$, for example, $LiAlO_2$. As shown in FIG. 1, $LiAlO_2$. has a tetragonal crystal structure. Shown in FIG. 1 is a tetragonal unit cell 110 viewed along a short axis.

In the ion conductor represented by Formula 1 a deficiency of the M1 element is introduced, as compared with $LiMO_2$. When a portion of the M1 crystallographic sites become empty due to a deficiency of M1, a pathway for lithium ions may be provided, and thus ion conductivity may be improved.

In Formula 1, x is in a range of $0<x<1$, for example, about 0.01 to about 0.5, about 0.02 to about 0.4, about 0.03 to about 0.3, about 0.04 to about 0.2, or about 0.05 to about 0.1. When x is within these ranges in Formula 1, the M1 deficiency may be introduced while maintaining a crystal structure, and a solid electrolyte having improved ionic conductivity may be provided.

In the ion conductor represented by Formula 2 a deficiency of lithium (Li) is introduced by introducing an X element having a valence of −1 into an oxygen (O) site, as compared with $LiMO_2$. Because oxygen has a valance of −2, to maintain charge neutrality the material becomes lithium deficient, and a portion of the lithium sites become empty due to deficiency. A pathway for lithium ions may be provided, and thus ion conductivity may be improved.

In Formula 2, as described, X is at least one of a halogen atom or a pseudohalogen.

As previously mentioned, "pseudohalogen" refers to a molecule or group including two or more electronegative atoms that resemble halogens in a free state, and generates anions similar to halide ions. Examples of pseudohalogen include cyanide, cyanate, thiocyanate, azide, and combinations thereof.

X may be at least one halogen atom, and substitute for a portion of the oxygen in Formula 2. X may be, for example, at least one of chlorine (Cl), bromine (Br), fluorine (F), cyanide, cyanate, thiocyanate, or azide.

In Formula 2, y is in a range of $0<y<1$, for example, $0<y\leq0.5$, for example, about 0.01 to about 0.5, about 0.01 to about 0.4, about 0.02 to about 0.3, about 0.03 to about 0.3, about 0.04 to about 0.1, or about 0.05 to about 0.1. When y is within these ranges in Formula 2, deficiency of lithium may be introduced while maintaining a crystal structure, resulting in empty lithium sites or lithium defects, and a solid electrolyte having improved ionic conductivity may be provided.

In the ion conductor represented by Formula 3, a deficiency or excess of lithium (Li) is introduced by introducing a heterogeneous element D, which is different from M3 at an M3 element site, as compared with $LiMO_2$. D may substitute for a portion of the M3. Ion conductivity may be improved by providing a pathway for lithium ions through deficiency or excess of the lithium (Li) site.

In Formula 3, D is a heterogeneous element different from M3 and is at least one of a monovalent element to a hexavalent element, and may be, for example, a divalent element, a trivalent element, a tetravalent element, or a pentavalent element. D may be at least one of hafnium (Hf), tantalum (Ta), magnesium (Mg), calcium (Ca), sodium (Na), potassium (K), chromium (Cr), vanadium (V), iron (Fe), copper (Cu), zinc (Zn), zirconium (Zr), strontium (Sr), antimony (Sb), yttrium (Y), niobium (Nb), gallium (Ga), silicon (Si), tin (Sn), molybdenum (Mo), tungsten (W), barium (Ba), or a rare earth element. Specifically, D may be, for example, hafnium (Hf), tantalum (Ta), magnesium (Mg), or zinc (Zn).

In Formula 3, z is in a range of $0<z<1$, for example, about 0.01 to about 0.5, about 0.02 to about 0.4, about 0.03 to about 0.3, about 0.04 to about 0.2, or about 0.05 to about 0.1. When z is within these ranges in Formula 3, an M3 deficiency may be introduced while maintaining a crystal structure, and a solid electrolyte having improved ionic conductivity may be provided.

Examples of the ion conductor represented by Formulae 1 to 3 may include, but are not limited to, at least one of $Li_{1.45}Al_{0.95}O_2$, $Li_{1.3}Al_{0.9}O_2$, $Li_{1.6}Al_{0.8}O_2$, $Li_{1.9}Al_{0.7}O_2$, $Li_{0.99}AlO_{1.99}F_{0.01}$, $Li_{0.95}AlO_{1.95}F_{0.05}$, $Li_{0.9}AlO_{1.9}F_{0.1}$, $Li_{0.6}AlO_{1.8}F_{0.2}$, $Li_{0.7}AlO_{1.7}F_{0.3}$, $Li_{0.99}AlO_{1.99}Cl_{0.01}$, $Li_{0.95}AlO_{1.95}Cl_{0.05}$, $Li_{0.9}AlO_{1.9}Cl_{0.1}$, $Li_{0.8}AlO_{0.8}AlO_{1.8}Cl_{0.2}$, $Li_{0.7}AlO_{1.7}Cl_{0.3}$, $Li_{0.99}AlO_{1.99}Br_{0.01}$, $Li_{0.95}AlO_{1.9}Br_{0.055}$, $Li_{0.9}AlO_{1.9}Br_{0.1}$, $Li_{0.8}AlO_{1.8}Br_{0.2}$, $Li_{0.7}AlO_{1.7}Br_{0.3}$, $Li_{0.9}Al_{0.9}Hf_{0.1}O_2$, $Li_{0.8}Al_{0.9}Ta_{0.1}O_2$, $Li_{1.1}Al_{0.9}Mg_{0.1}O_2$, or $Li_{1.1}Al_{0.9}Zn_{0.1}O_2$.

The solid electrolyte including the ion conductor represented by at least one of Formulae 1 to 3 has greater ion conductivity than $LiMO_2$. For example, the solid electrolyte has an ion conductivity of about $1\times10^{-7}$ mS/cm or more, for example, about $2\times10^{-7}$ mS/cm or more, about $3\times10^{-7}$ mS/cm or more, $4\times10^{-7}$ mS/cm or more, about $5\times10^{-7}$ mS/cm or more, about $6\times10^{-7}$ mS/cm or more, about $7\times10^{-7}$ mS/cm or more, about $8\times10^{-7}$ mS/cm or more, about $9\times10^{-7}$ mS/cm or more, or about $1\times10^{-6}$ mS/cm or more. after immersion in a saturated lithium hydroxide solution. As used herein, the "ion conductivity after immersion in a saturated lithium hydroxide solution" refers to ion conductivity after contacting a solid electrolyte with a saturated lithium hydroxide solution and maintaining at 40° C. for 7 days. In an aspect, the immersion can be at 20° C., and for 1 hour. The saturated lithium hydroxide solution is washed from the solid electrolyte prior to measuring conductivity of the solid electrolyte. At a temperature of 25° C., the solid electrode may have, for example, an ion conductivity of about $1\times10^{-7}$ mS/cm to about $1\times10^1$ mS/cm, about $2\times10^{-7}$ mS/cm to about $1\times10^1$ mS/cm, about $2\times10^{-6}$ mS/cm to about 5 mS/cm, about $4\times10^{-6}$ mS/cm to about 5 mS/cm, about $4\times10^{-6}$ mS/cm to about 1 mS/cm, about $5\times10^{-6}$ mS/cm to about 1 mS/cm, about $1\times10^{-6}$ mS/cm to about 1 mS/cm, about $2\times10^{-6}$ mS/cm to about 1 mS/cm, about $4\times10^{-6}$ mS/cm to about 1 mS/cm, about $5\times10^{-6}$ mS/cm to about 1 mS/cm, about $1\times10^{-4}$ mS/cm to about 1 mS/cm, about $2\times10^{-4}$ mS/cm to about 1 mS/cm, about $2\times10^{-4}$ mS/cm to about $5\times10^{-1}$ mS/cm, or about $2\times10^{-4}$ mS/cm to about $1\times10^{-1}$ mS/cm, after immersion in a saturated lithium hydroxide solution.

In an embodiment, the solid electrolyte has an ion conductivity of about $1\times10^{-6}$ mS/cm or more, about $2\times10^{-6}$ mS/cm or more, about $3\times10^{-6}$ mS/cm or more, about $4\times10^{-6}$ mS/cm or more, about $5\times10^{-6}$ mS/cm or more, about $6\times10^{-6}$ mS/cm or more, about $7\times10^{-6}$ mS/cm or more, or about $8\times10^{-6}$ mS/cm or more. At a temperature of 25° C., the solid electrode may have, for example, an ion conductivity of about $1\times10^{-6}$ mS/cm to about $1\times10^2$ mS/cm, about $2\times10^{-6}$ mS/cm to about $1\times10^2$ mS/cm, about $2\times10^{-6}$ mS/cm to about 10 mS/cm, about $4\times10^{-6}$ mS/cm to about 10 mS/cm, about $4\times10^{-6}$ mS/cm to about 5 mS/cm, about $5\times10^{-6}$ mS/cm to about 5 mS/cm, about $1\times10^{-4}$ mS/cm to about 1 mS/cm, about $2\times10^{-4}$ mS/cm to about 1 mS/cm, about $4\times10^{-4}$ mS/cm to about 1 mS/cm, about $5\times10^{-4}$ mS/cm to about 1 mS/cm, about $1\times10^{-3}$ mS/cm to about 1 mS/cm, about $2\times10^{-3}$ mS/cm to about 1 mS/cm, about $2\times10^{-3}$ mS/cm to about $5\times10^{-1}$ mS/cm, or about $2\times10^{-3}$ mS/cm to about $1\times10^{-1}$ mS/cm. As such, the ionic conductivity of the solid electrolyte is maintained even after the solid electrolyte is exposed to a strong base. As a result, it may be found that the solid electrolyte has excellent stability against strong bases.

The ion conductivity retention of the solid electrolyte after being immersed in a saturated lithium hydroxide (LiOH) solution may be about 50% or more, for example, about 56% or more, about 95% or more, about 100% or more, about 150% or more, or about 220% or more. The ionic conductivity retention may be, for example, about 50% to about 300%, about 75% to about 250%, about 95% to about 200%, or about 100% to about 150%. The solid electrolyte has an ion conductivity after contacting with saturated lithium hydroxide of 50% to 300% of an ion conductivity before the contacting with saturated lithium hydroxide.

As used herein, the "ion conductivity retention for a saturated lithium hydroxide (LiOH) solution" is calculated by Equation 1.

Ion conductivity retention (%)={(ion conductivity before immersed in saturated lithium hydroxide solution−ion conductivity after immersed in saturated lithium hydroxide solution)/(ion conductivity before immersed in saturated lithium hydroxide solution)}×100%   Equation 1

The ion conductivity of the solid electrolyte according to an embodiment at 25° C. may be, for example, about $1.0\times10^{-6}$ mS/cm or more, about $1.0\times10^{-5}$ mS/cm or more, or about $3.0\times10^{-5}$ mS/cm or more. At a temperature of 25° C., the solid electrode may have, for example, an ion conductivity of about $1\times10^{-6}$ mS/cm to about $1\times10^2$ mS/cm, about $2\times10^{-6}$ mS/cm to about $1\times10^2$ mS/cm, about $2\times10^{-5}$ mS/cm to about 10 mS/cm, about $4\times10^{-5}$ mS/cm to about 10 mS/cm, about $4\times10^{-5}$ mS/cm to about 5 mS/cm, about $5\times10^{-5}$ mS/cm to about 5 mS/cm, about $1\times10^{-4}$ mS/cm to about 1 mS/cm, about $2\times10^{-4}$ mS/cm to about 1 mS/cm, about $4\times10^{-4}$ mS/cm to about 1 mS/cm, about $5\times10^{-4}$ mS/cm to about 1 mS/cm, about $1\times10^{-3}$ mS/cm to about 1 mS/cm, about $2\times10^{-3}$ mS/cm to about 1 mS/cm, about $2\times10^{-3}$ mS/cm to about $5\times10^{-1}$ mS/cm, or about $2\times10^{-3}$ mS/cm to about $1\times10^{-1}$ mS/cm. When the solid electrolyte has ion conductivity in these ranges, the internal resistance of a lithium air battery containing such a solid electrolyte is reduced.

The solid electrolyte may be present in the form of a particle. The solid electrolyte particle has an average particle diameter of about 5 nm to about 500 μm, about 100 nm to about 15 μm, or about 300 nm to about 10 μm, and have a specific surface area of about 0.01 $m^2$/g to about 1000 $m^2$/g or about 0.5 $m^2$/g to about 100 $m^2$/g.

When analyzed by X-ray diffraction using CuKα radiation, the solid electrolyte may have a first diffraction peak having a maximum at about 22.3±1.0° 2θ, a second diffraction peak having a maximum at about 24.0±1.0°2θ, and a third diffraction peak having a maximum at about 28.5±1.0° 2θ

A method of preparing a solid electrolyte according to an embodiment is described herein.

The method of preparing a solid electrolyte includes: mixing a lithium precursor and an M precursor to prepare a precursor mixture; and heat-treating the precursor mixture, wherein the precursor mixture satisfies at least one of i), ii), or iii), and the solid electrolyte comprises an ion conductor represented by at least one of Formulae 1 to 3 is obtained by the heat treatment:

i) the precursor mixture has a lithium precursor content in a range of resulting in a stoichiometric lithium deficiency, ii) the precursor mixture further includes an X precursor, and/or iii) the precursor mixture further includes a D precursor.

The lithium precursor and at least one of the M1 precursor, the M2 precursor, or the M3 precursor, and selectively, the X precursor and/or the D precursor are mixed in a stoichiometric composition to obtain a precursor mixture. M1 of the M1 precursor, M2 of the M2 precursor, M3 of the M3 precursor, X of the X precursor, and D of the D precursor are the same as the definitions of M1, M2, M3, X, and D described in Formulae 1 to 3.

A solvent may be added to the precursor mixture.

As the solvent, any suitable solvent may be used as long as it may dissolve or disperse raw materials of the lithium precursor and the M precursor. The solvent may be, for example, at least one of ethanol, water, ethylene glycol, or isopropanol.

The mixing may be carried out according to a method such as milling, blending or stirring. In the milling, for example, a ball mill, air jet mill, bead mill, or roll mill may be used.

Subsequently, the precursor mixture is heat-treated.

In an embodiment, the heat-treatment may include: performing a heat-treatment of the precursor mixture; pulverizing the heat-treated precursor mixture to obtain a powder; and heat-treating the powder.

The heat-treatment of the powder may be carried out at a temperature greater than a temperature of the heat-treatment of the precursor mixture.

In the heat-treatment of the precursor mixture, the temperature increase rate is about 1° C./min to about 10° C./min, and the heat-treatment temperature is about 700° C. to about 1000° C. or about 750° C. to about 900° C. When the temperature increase rate is within these ranges in the heat-treatment of the precursor mixture, the heat-treatment may be sufficient to obtain a solid electrolyte having a desired crystal structure. An additional heat-treatment process may be performed to obtain the solid electrolyte.

The heat-treatment may be carried out under an oxidative gas atmosphere. The oxidative gas atmosphere may be formed using air or oxygen. The heat-treatment time is selected depending on the heat-treatment temperature, and is, for example, about 1 hour to about 12 hours, about 1 hours to about 10 hours, or about 2 hours to about 5 hours.

The M precursor may be at least one of an M-containing oxide, an M-containing carbonate, an M-containing chloride, an M phosphate, an M hydroxide, or an M nitrate. For example, the M precursor may be at least one of aluminum oxide, gallium oxide, indium oxide, scandium oxide, yttrium oxide, lanthanum oxide, gadolinium oxide, cerium oxide, manganese oxide, chromium oxide, cobalt oxide, nickel oxide, ruthenium oxide, or molybdenum oxide.

The X precursor is, for example, at least one of lithium chloride, lithium fluoride or lithium bromide. The lithium precursor may be, for example, at least one of lithium oxide, lithium carbonate, lithium chloride, lithium sulfide, lithium nitrate, lithium phosphate, or lithium hydroxide.

The D precursor may be at least one of a D-containing oxide, D-containing carbonate, D-containing chloride, D phosphate, D hydroxide, or D nitrate. For example, the D precursor may be at least one of hafnium oxide, tantalum oxide, magnesium oxide, zinc oxide, zirconium oxide, titanium oxide, manganese oxide, chromium oxide, cobalt oxide, nickel oxide, ruthenium oxide, niobium oxide, silver oxide, molybdenum oxide, tungsten oxide, or tin oxide.

The contents of the lithium precursor, at least one of the M1 precursor, the M2 precursor, or the M3 precursor, and optionally at least one of the X precursor or the D precursor, are stoichiometrically selected to obtain the ion conductors represented by Formulae 1 to 3.

Subsequently, the heat-treated product, for example, a precursor mixture, is pulverized to obtain a powder. The powder is, for example, a powder particle. The powder, which comprises a powder particle, obtained by pulverizing has a size of about 10 μm or less, for example between about 1 nm to about 10 μm, between about 10 nm to about 5 μm, between about 100 nm to about 1 μm, between about 200 nm to about 700 nm. When the size of the powder particle is within these ranges, the formation of a NASICON crystal phase may be facilitated.

Subsequently, a heat-treatment of the powder is carried out. In the heat-treatment of the powder, the temperature increase rate is about 1° C./min to about 10° C./min. The heat-treatment of the powder may be carried out at 500° C. to about 1300° C., for example, about 700° C. to about 900° C.

In an embodiment, the heat-treatment of the compact may be carried out at a temperature greater than a temperature of the heat-treatment of the precursor mixture. When the heat-treatment of the compact is carried out at a temperature greater than a temperature of the heat-treatment of the precursor mixture, crystallinity of a solid electrolyte may be improved.

In an embodiment, before the heat-treating of the powder, the powder may be pressed to be made in a pellet form. When the heat-treatment of the powder is in the form of a pellet, the diffusion distance of a material to be heat-treated is shortened, so that a desired solid electrolyte may be easily prepared. When the heat-treatment proceeds in a powder particle form, not in a pellet form, the oxide of Formula 1 may be made, but longer heat-treatment time and a higher temperature may be required because the diffusion distance thereof is increased compared to when the pellet is heat-treated.

The heat-treatment may be finally determined by the desired compositions of Formula 1 to 3, and may be carried out under an oxidative gas atmosphere, a reducing gas atmosphere, or an inert gas atmosphere. The oxidative gas atmosphere may be formed using air or oxygen, the reducing gas atmosphere may be formed using a reducing gas such as hydrogen, and inert gas atmosphere may be formed using an inert gas such as nitrogen, argon, or helium.

The duration of the heat-treatment is selected depending on the temperature of the heat-treatment, and, for example, may be about 1 hour to about 50 hours or about 6 hours to about 48 hours. After the heat-treatment, the ion conductor of at least one of Formulae 1 to 3 is formed.

When the temperature increase rates and heat-treatment temperatures during the heat-treatments are within these ranges, not only is a desired crystal structure formed, but synthesis time is reduced and thus economical.

In an embodiment, the method may further include: pulverizing the product obtained after a heat-treatment. The size of the powder particles obtained by the pulverizing may be about 500 μm or less, for example, about 1 nm to about 500 μm, about 10 nm to about 100 μm, about 100 nm to about 10 μm, or about 500 nm to about 1 μm. When the size of the powder particle is within these ranges, the pulverizing and mixing are sufficient because the size of the particles is small and formation of crystal phases of the ion conductors represented by Formulae 1 to 3 occurs. The "size" refers to an average diameter when particles are spherical, and refers to a major axis length when particles are non-spherical. The size may be measured using an electron scanning microscope or a particle size analyzer.

The solid electrolyte including the ion conductor is not only chemically stable in the presence of lithium metal, but also has improved ion conductivity.

The solid electrolyte according to an embodiment may be used in a metal air battery, for example, a lithium air battery. Further, the solid electrolyte may be used as an electrolyte of a lithium battery such as an all-solid battery. The solid electrolyte may be used in the production of a cathode and an anode of a battery, and may also be used in surface coating of a cathode and an anode.

According to an embodiment, an electrochemical device includes the solid electrolyte. When the electrochemical device includes the solid electrolyte that is not only chemically stable, but also has high ion conductivity, improved stability in the presence of moisture and strong bases, and thus the deterioration of the electrochemical device may be efficiently suppressed.

The electrochemical device is, but is not limited to, at least one of a battery, an accumulator, a supercapacitor, a fuel cell, a sensor, or an electrochromic device. Any suitable electrochemical device may be used.

The battery is, for example, a primary battery or a secondary battery. Examples of the battery may include, but are not limited to, a lithium battery or a sodium battery. Any suitable battery may be used. Examples of the lithium battery may include, but are not limited to, a lithium ion battery or a lithium air battery. Any suitable lithium battery may be used. Examples of the electrochromic device may include, but are not limited to, an electrochemical mirror, an electrochemical window, or an electrochemical screen. Any suitable electrochromic device may be used.

The electrochemical device is, for example, a metal air battery. The metal air battery may include a cathode. The cathode is an air electrode, which is disposed on a cathode current collector.

The cathode is, for example, porous. When the cathode is porous, air, oxygen, or the like easily diffuses into the cathode The metal air battery may be, for example, a lithium air battery.

A lithium air battery according to an embodiment includes: a cathode; an anode; and an electrolyte between the cathode and the anode, wherein the electrolyte includes the solid electrolyte.

Moreover, at least one of the cathode and the anode may include the solid electrolyte. The anode may include lithium.

The lithium air battery includes a cathode, and the cathode is disposed on a cathode current collector.

The cathode may include the solid electrolyte represented by Formulae 1 to 3. The content of the solid electrolyte is about 1 part by weight to about 100 parts by weight, about 10 parts by weight to about 100 parts by weight, about 50 parts by weight to about 100 parts by weight, about 60 parts by weight to about 100 parts by weight, about 80 parts by weight to about 100 parts by weight, or about 90 parts by weight to about 100 parts by weight, based on 100 parts by weight of the cathode. The cathode may be substantially made of the solid electrolyte. The cathode obtained by sintering and/or pressing the solid electrolyte may be substantially made of the solid electrolyte.

It is also possible to introduce pores into the cathode by introducing a pore forming agent during the production of the cathode. The cathode may be in the form of a porous pellet or a porous sheet, but the form thereof is not limited thereto, and may be formed according to a suitable battery form.

The cathode is permeable to gas such as oxygen or air. Therefore, this cathode is different from a commercially available cathode that is substantially impermeable to gas such as oxygen or air and conducts only ions. When the cathode is porous and/or permeable to a gas, oxygen and/or air easily diffuse into the cathode, and lithium ions and/or electrons easily move through the solid electrolyte included in the cathode, so that an electrochemical reaction by oxygen, lithium ions and electrons easily proceeds in the cathode.

In the manufacture of the cathode, in addition to the solid electrolyte, a commercially available conductive material may be further added to further increase electron conductivity and ion conductivity. The conductive material may be porous. The conductive material has porosity, thereby allowing air to penetrate the conductive material. The conductive material may be any suitable material having porosity and/or conductivity, and is, for example, a carbon-based material having porosity. Examples of the carbon-based material may include, but are limited to, carbon black, graphite, graphene, active carbon, or carbon fiber. Any suitable carbon-based material may be used. The conductive material is, for example, a metallic material. Examples of the metallic material may include metal fiber, metal mesh, or metal powder. Examples of the metal powder may include copper powder, silver powder, or aluminum powder. The conductive material is, for example, an organic conductive material. Examples of the organic conductive material may include polyphenylene derivatives or polythiophene derivatives. The conductive materials are used alone or in combination. The cathode may include a composite conductor as the conductive material, and the cathode may further include the conductive material in addition to the composite conductor.

The cathode may include a catalyst for oxidation/reduction of oxygen. Examples of the catalyst may include, but are not limited to, precious metal catalysts such as platinum, gold, silver, palladium, ruthenium, rhodium, or osmium; oxide catalysts such as manganese oxide, iron oxide, cobalt oxide, or nickel oxide; and organometallic catalysts such as cobalt phthalocyanine. Any suitable catalyst may be used as long as it is a catalyst for oxidation/reduction of oxygen.

The catalyst is supported on a carrier. Examples of the carrier may include an oxide carrier, a zeolite carrier, a clay-based mineral carrier, or a carbon carrier. The oxide carrier is a metal oxide carrier including at least one of Al, Si, Zr, Ti, Ce, Pr, Sm, Eu, Tb, Tm, Yb, Sb, Bi, V, Cr, Mn, Fe, Co, Ni, Cu, Nb, Mo, or W. Examples of the oxide carrier include alumina, silica, zirconium oxide, or titanium dioxide. Examples of the carbon carrier may include, but are not limited to, carbon black such as ketjen black, acetylene black, tannel black, or lamp black; graphite such as natural graphite, artificial graphite, or expanded graphite; active carbons; or carbon fibers. Any suitable carbon carrier may be used.

The cathode may include a binder. The binder includes a thermoplastic resin or a thermosetting resin. Examples of the binder may include, but are limited to, polyethylene, polypropylene, polytetrafluoroethylene (PTFE), polyvinylidene fluoride (PVDF), styrene-butadiene rubber, a tetrafluoroethylene-perfluoroalkylvinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, or an ethylene-acrylic acid copolymer, which may be used alone or in combination. Any suitable binder may be used.

The cathode is manufactured by mixing a conductive material, an oxygen oxidation/reduction catalyst, and a binder to obtain a mixture, adding an appropriate solvent to the mixture to prepare a cathode slurry, and then applying the cathode slurry onto the surface of a substrate and drying the applied cathode slurry or pressing the cathode slurry onto the substrate to improve electrode density. The substrate is, for example, a cathode current collector, a separator, or a solid electrolyte film. The cathode current collector is, for example, a gas diffusion layer. The conductive material includes a composite conductor, and the oxygen oxidation/reduction catalyst and the binder in the cathode may be omitted depending on the type of anode desired.

The lithium air battery includes an anode. The anode may include the solid electrolyte.

The anode includes lithium or a lithium alloy.

The anode is, for example, a lithium metal thin film or a lithium-based alloy thin film. The lithium-based alloy is, for example, an alloy of lithium with aluminum, tin, magnesium, indium, calcium, titanium, or vanadium.

The lithium air battery includes an electrolyte disposed between the cathode and the anode.

The electrolyte may be the solid electrolyte including the ion conductor represented by at least one of Formulae 1 to 3.

The electrolyte may further include at least one of a commercially available solid electrolyte, a gel electrolyte, and a liquid electrolyte, in addition to the solid electrolyte. The solid electrolyte, the gel electrolyte, and the liquid electrolyte are not particularly limited. Any suitable electrolyte may be used.

The solid electrolyte includes, but is not limited to, at least one of a solid electrolyte including an ion conductive inorganic material, a solid electrolyte including a polymeric ionic liquid (PIL) and a lithium salt, a solid electrolyte including an ionically conducting polymer and a lithium salt, or a solid electrolyte including an electron conductive polymer. Any suitable solid electrolyte may be used.

The ion conductive inorganic material includes, but is not limited to, at least one of a glass or amorphous metal ion conductor, a ceramic active metal ion conductor, or a glass ceramic active metal ion conductor. Any suitable ion conductive inorganic material may be used. The ion conductive inorganic material is, for example, an ion conductive inorganic particle or a sheet-shaped compact thereof.

Examples of the ion conductive inorganic material may include at least one of $BaTiO_3$, $Pb(Zr_aTi_{1-a})O_3$(PZT) ($0 \le a < 1$), $Pb_{1-x}La_xZr_{1-y}Ti_yO_3$(PLZT) ($0 \le x < 1$, $0 \le y < 1$), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0 \le x < 1$, $0 \le y \le 1$, $0 \le a \le 1$, and $0 \le b \le 1$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3, 0<y<2$, $0<z<4$)-based glass, $P_2S_5$($Li_xP_yS_z$, $0<x<3$, $0<y<3$, $0<z<7$)-based glass, $Li_2O$, LiF, LiOH, $Li_2CO_3$, $LiAlO_2$, $Li_2O$—$Al_2O_3$—$SiO_2$—$P_2O_6$—$TiO_2$—$GeO_2$-based ceramics, or garnet-based ceramics ($Li_{3+x}La_3M_2O_{12}$(M=Te, Nb, Zr)).

The polymeric ionic liquid (PIL) includes i) at least one of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazium-based cation, and ii) at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$. Examples of the polymeric ionic liquid (PIL) may include poly(diallyldimethylammonium) bis(trifluoromethane)sulfonimide (TFSI), poly(1-allyl-3-methylimidazolium trifluoromethanesulfonylimide), or poly((N-methyl-N-propylpiperidinium bis(trifluoromethanesulfonyl)imide).

The ion conductive polymer includes at least one ion conductive repeating unit of an ether-based monomer, an acrylic monomer, a methacrylic monomer, or a siloxane-based monomer.

Examples of the ion conductive polymer may include, but are not limited to, polyethylene oxide (PEO), polyvinyl alcohol (PVA), polyvinylpyrrolidone (PVP), polyvinyl sulfone, polypropylene oxide (PPO), polymethyl methacrylate, polyethyl methacrylate, polydimethylsiloxane, polyacrylic acid, polymethacrylic acid, polymethylacrylate, polyethylacrylate, poly2-ethylhexyl acrylate, polybutyl methacrylate, poly2-ethylhexyl methacrylate, polydecyl acrylate, polyethylene vinyl acetate, phosphate ester polymer, polyester sulfide, polyvinylidene fluoride (PVdF), or Li-substituted Nafion. Any suitable ion conductive polymer may be used.

Examples of the electron conductive polymer may include, but are not limited to, polyphenylene derivatives or polythiophene derivatives. Any suitable electron conductive polymer may be used.

The gel electrolyte is obtained by adding a low-molecular-weight solvent to the solid electrolyte disposed between the cathode and the anode. The gel electrolyte is obtained by adding a solvent or an oligomer, which has a low-molecular-weight, to a conductive polymer.

The liquid electrolyte includes a solvent and a lithium salt.

The solvent may include, but is not limited to, at least one of an organic solvent, an ionic liquid, or an oligomer. Any suitable solvent may be used as long as it is a liquid at room temperature (25° C.).

The organic solvent includes at least one of an ether-based solvent, a carbonate-based solvent, an ester-based solvent, and a ketone-based solvent. The organic solvent may include, but is not limited to, at least one of propylene carbonate, ethylene carbonate, fluoroethylene carbonate, vinyl ethylene carbonate butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, methoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane (e.g., 1,2-dimethoxyethane), 2-methyltetrahydrofuran, or tetrahydrofuran. Any suitable organic solvent may be used as long as it is a liquid at room temperature.

The ionic liquid (IL) includes i) at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazium-based cation, and ii) at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6 P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$.

The lithium salt may include, but is not limited to, at least one of LiTFSI, $LiPF_6$, $LiBF_4$, $LiAsF_6$, $LiClO_4$, $LiNO_3$, (lithium bis(oxalato) borate(LiBOB), $LiCF_3SO_3$, $LiN(SO_2CF_3)_2$, $LiN(SO_2C_2F_5)_2$, $LiN(SO_2F)_2$, $LiC(SO_2CF_3)_3$, $LiN(SO_3CF_3)_2$, $LiC_4F_9SO_3$, $LiAlCl_4$, or $CF_3SO_3Li$. Any suitable lithium salt may be used. The concentration of the lithium salt is, for example, about 0.01 M to about 5 M, about 0.05 M to about 4.5 M, about 0.1 M to about 4 M, or about 1 M to about 3 M.

The lithium air battery may include a separator between the cathode and the anode. The separator is not limited as long as it has a composition capable of enduring the use of the lithium air battery. Examples of the separator may include at least one of a polymer non-woven fabric such as a polypropylene non-woven fabric or a polyphenylene sulfide non-woven fabric; a porous film of olefin resin such as polyethylene or polypropylene; or a glass fiber.

The electrolyte has a structure in which a separator is impregnated with a solid polymer electrolyte or a structure in which a separator is impregnated with a liquid electrolyte. The electrolyte having a structure in which a separator is impregnated with a solid polymer electrolyte is prepared by placing a solid polymer electrolyte film on one surface or both surfaces of the separator and roll-pressing the solid polymer electrolyte film. The electrolyte having a structure in which a separator is impregnated with a liquid electrolyte is prepared by injecting a liquid electrolyte containing a lithium salt into the separator.

The lithium air battery is prepared by placing an anode on one surface in a case, placing an electrolyte layer on the anode, placing a cathode on the electrolyte layer, placing a porous cathode current collector on the cathode, placing a pushing member on the porous cathode current collector to transfer air to an air electrode, and pushing the pushing member to fix a cell. The case may be separated into an upper portion that is in contact with the anode and a lower portion that is in contact with the air electrode, and may be provided with an insulating resin between the upper portion and the lower portion to electrically insulate the cathode and the anode from each other.

The lithium air battery may be used in both primary and secondary batteries. The shape of the lithium air battery is not particularly limited, and is, for example, a coin shape, a button shape, a sheet shape, a laminate shape, a cylinder shape, a flat shape, or a horn shape. The lithium air battery may be used as a medium-sized battery or large-sized battery for an electric vehicle.

Figure 4:
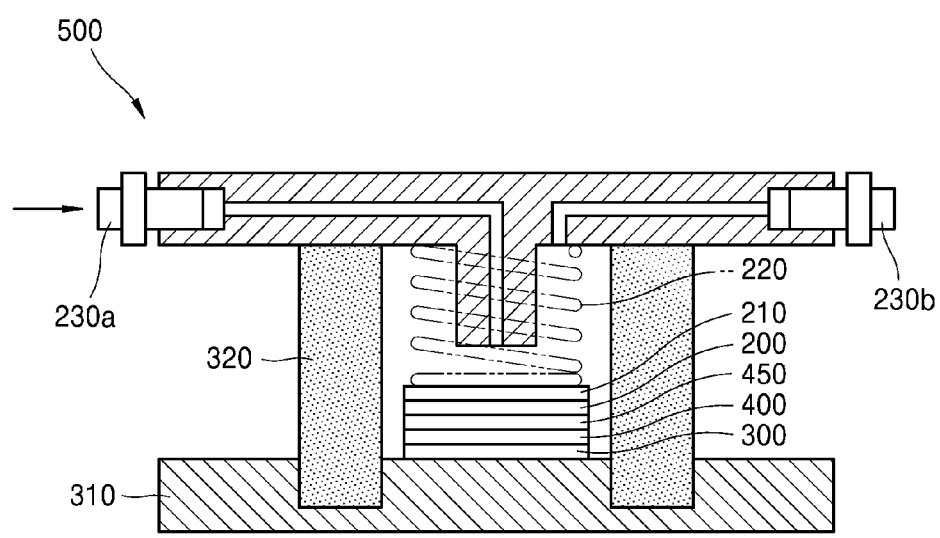
FIG. 4 is a schematic view illustrating an embodiment of a lithium air battery.

FIG. 4 is a schematic cross-sectional view illustrating a structure of a lithium air battery according to an embodiment.

Referring to FIG. 4, a lithium air battery 500 has a structure in which a first electrolyte 400 is interposed between a cathode 200 containing oxygen adjacent to a first current collector 210 as an active material and an anode 300 containing lithium adjacent to a second current collector 310. The first electrolyte 400 may be a separator impregnated with a liquid electrolyte.

A second electrolyte 450 may be provided between the anode 200 and the first electrolyte 400. The second electrolyte 450 is a lithium ion conductive solid electrolyte film. The first current collector 210 is porous, and may also serve as a gas diffusion layer capable of diffusing air. A pushing member 220 capable of transferring air to the cathode 200 is disposed on the first current collector 210.

An insulating resin case 320 is interposed between the cathode 200 and the anode 300 to electrically separate the cathode 200 and the anode 300. Air is supplied to an air inlet 230a and discharged to an air outlet 230b. The lithium air battery 500 may be prepared in a stainless steel container.

The "air" of the lithium air battery is not limited to atmospheric air, and may include a combination of gases containing oxygen or pure oxygen gas. This broad definition of the term "air" applies to all applications, for example, air cells or air cathodes.

The lithium air battery may be used in any field where secondary batteries are employed.

Hereinafter, the present disclosure will be described in detail with reference to Examples and Comparative Examples. However, these Examples are provided for only illustrative purposes, and the scope of the present disclosure is not limited thereto.

EXAMPLES

Preparation of Solid Electrolyte

Comparative Example 1

$LiAlO_2$ $Li_2CO_3$, which is a lithium precursor, and $Al_2O_3$, which is an Al precursor, were mixed according to the composition ratio of $LiAlO_2$, and ethanol was added thereto and mixed to obtain a precursor mixture. The precursor mixture was put into a ball-milling apparatus, and was pulverized and mixed for 4 hours. The resulting mixture was dried, heated to about 800° C. at a temperature increase rate of about 5° C./min, and then heat-treated for 23 hours under an air atmosphere to obtain powder.

The powder obtained by heat-treatment was ground, and then pressed to prepare a pellet. Heat-treating of the pellet was carried out at about 850° C. for 12 hours under an air atmosphere to obtain a target. When heat-treating was carried out at about 850° C., the temperature increase rate was about 5° C./min.

Example 1

$Li_{0.8}Al_{0.9}Ta_{0.1}O_2$

A solid electrolyte was obtained in the same manner as in Comparative Example 1, except that, in the preparation of the precursor mixture, $Ta_2O_5$ was further added, and the contents of $Li_2CO_3$, $Al_2O_3$, and $Ta_2O_5$ were stoichiometrically selected to obtain $Li_{0.8}Al_{0.9}Ta_{0.1}O_2$.

Example 2

$Li_{0.9}AlO_{1.9}F_{0.1}$

A solid electrolyte was obtained in the same manner as in Comparative Example 1, except that, in the preparation of the precursor mixture, LiF was further added, and the contents of $Li_2CO_3$, $Al_2O_3$, and LiF were stoichiometrically selected to obtain $Li_{0.9}AlO_{1.9}F_{0.1}$.

Example 3

$Li_{0.95}AlO_{1.95}Cl_{0.05}$

A solid electrolyte was obtained in the same manner as in Comparative Example 1, except that, in the preparation of the precursor mixture, LiCl was further added, and the contents of $Li_2CO_3$, $Al_2O_3$, and LiCl were stoichiometrically selected to obtain $Li_{0.95}AlO_{1.95}Cl_{0.05}$.

Example 4

$Li_{1.3}Al_{0.9}O_2$

A solid electrolyte was obtained in the same manner as in Comparative Example 1, except that, in the preparation of the precursor mixture, the contents of $Li_2CO_3$ and $Al_2O_3$ were stoichiometrically selected to obtain $Li_{1.3}Al_{0.9}O_2$.

Example 5

$Li_{1.1}Al_{0.9}Zn_{0.1}O_2$

A solid electrolyte was obtained in the same manner as in Comparative Example 1, except that, in the preparation of the precursor mixture, the contents of $Li_2CO_3$, $Al_2O_3$, and ZnO were stoichiometrically controlled so as to obtain $Li_{1.1}Al_{0.9}Zn_{0.1}O_2$.

Example 6

$Li_{0.9}AlO_{1.9}Cl_{0.1}$

A solid electrolyte was obtained in the same manner as in Comparative Example 1, except that, in the preparation of the precursor mixture, LiCl was further added, and the contents of $Li_2CO_3$, $Al_2O_3$, and LiCl were stoichiometrically selected to obtain $Li_{0.9}AlO_{1.9}Cl_{0.1}$.

Example 7

$Li_{0.9}Al_{0.9}Hf_{0.1}O_2$

A solid electrolyte was obtained in the same manner as in Comparative Example 1, except that, in the preparation of the precursor mixture, the contents of $Li_2CO_3$, $Al_2O_3$, and $HfO_2$ were stoichiometrically selected to obtain $Li_{0.9}Al_{0.9}Hf_{0.1}O_2$.

Example 8

$Li_{0.8}AlO_{1.8}Cl_{0.2}$

A solid electrolyte was obtained in the same manner as in Comparative Example 1, except that, in the preparation of the precursor mixture, the contents of $Li_2CO_3$, $Al_2O_3$, and LiCl were stoichiometrically selected to obtain $Li_{0.8}AlO_{1.8}Cl_{0.2}$.

Example 9

$Li_{1.1}Al_{0.9}Mg_{0.1}O_2$

A solid electrolyte was obtained in the same manner as in Comparative Example 1, except that, in the preparation of the precursor mixture, the contents of $Li_2CO_3$, $Al_2O_3$, and MgO were stoichiometrically selected to obtain $Li_{1.1}Al_{0.9}Mg_{0.1}O_2$.

Example 10

$Li_{0.95}AlO_{1.95}F_{0.05}$

A solid electrolyte was obtained in the same manner as in Comparative Example 1, except that, in the preparation of the precursor mixture, the contents of $Li_2CO_3$, $Al_2O_3$, and LiF were stoichiometrically selected to obtain $Li_{0.95}AlO_{1.95}F_{0.05}$.

Example 11

$Li_{0.8}AlO_{1.8}F_{0.2}$

A solid electrolyte was obtained in the same manner as in Comparative Example 1, except that, in the preparation of the precursor mixture, the contents of $Li_2CO_3$, $Al_2O_3$, and LiF were stoichiometrically selected to obtain $Li_{0.8}AlO_{1.8}F_{0.2}$.

Manufacture Example 1

Manufacture of Lithium Air Battery (Anode/Solid Electrolyte/PEO/Li Cathode)

40 parts by weight of carbon (Super-P), 10 parts by weight of polytetrafluoroethylene (PTFE), and 50 parts by weight of NMP (N-methylpyrrolidone) were mixed to prepare a cathode slurry, and then the cathode slurry was applied and roll-pressed to obtain a cathode composite sheet. The cathode composite sheet was pressed onto a stainless mesh, and then vacuum-dried in an oven at about 100° C. for 120 minutes to obtain a cathode.

The center of an aluminum film (polypropylene coated aluminum film, thickness 200 μm) having a size of 5 cm×5 cm was perforated to form a hole, and the hole was clogged with the LATP solid electrolyte of Example 1 (Ohara Co., Ltd., LICGC, thickness 250 μm) having a size of 1.4 cm×1.4 cm using an adhesive to prepare a first aluminum film provided with the solid electrolyte of Example 1. Next, a second aluminum film having a size of 5 cm×5 cm, a copper current collector (thickness 20 μm), a lithium foil (1.4 cm×1.4 cm, thickness 100 μm), a separator (Celgard-3501, manufactured by Celgard Corporation) having a thickness of 25 μm and made of a polypropylene material impregnated with an electrolyte solution of a mixture of 1M LiTFSI and PC, and the first aluminum film were laminated, heated in vacuum, and adhered to obtain an aluminum pouch-type lithium anode.

The lithium anode was provided in a stainless case, and the cathode provided with the separator (Celgard-3501, manufactured by Celgard Corporation) having a thickness of about 25 μm and made of a polypropylene material was set to face the anode. Subsequently, a porous gas diffusion layer made of carbon fiber was placed on the cathode, a foamed nickel plate was placed on the porous gas diffusion layer, and a pushing member for transferring air to the cathode was pressed onto the foamed nickel plate to manufacture a lithium air battery.

Manufacture Examples 2 to 11

Manufacture of Lithium Air Batteries

Lithium air batteries were manufactured in the same manner as in Manufacture Example 1, except that each of the solid electrolytes of Examples 2 to 11 was used instead of the solid electrolyte of Example 1.

Comparative Manufacture Example 1

Manufacture of Lithium Air Battery

A lithium air battery was manufactured in the same manner as in Manufacture Example 1, except that the solid electrolyte of Comparative Example 1 was used instead of the solid electrolyte of Example 1.

Evaluation Example 1

XRD Evaluation

Figure 2:
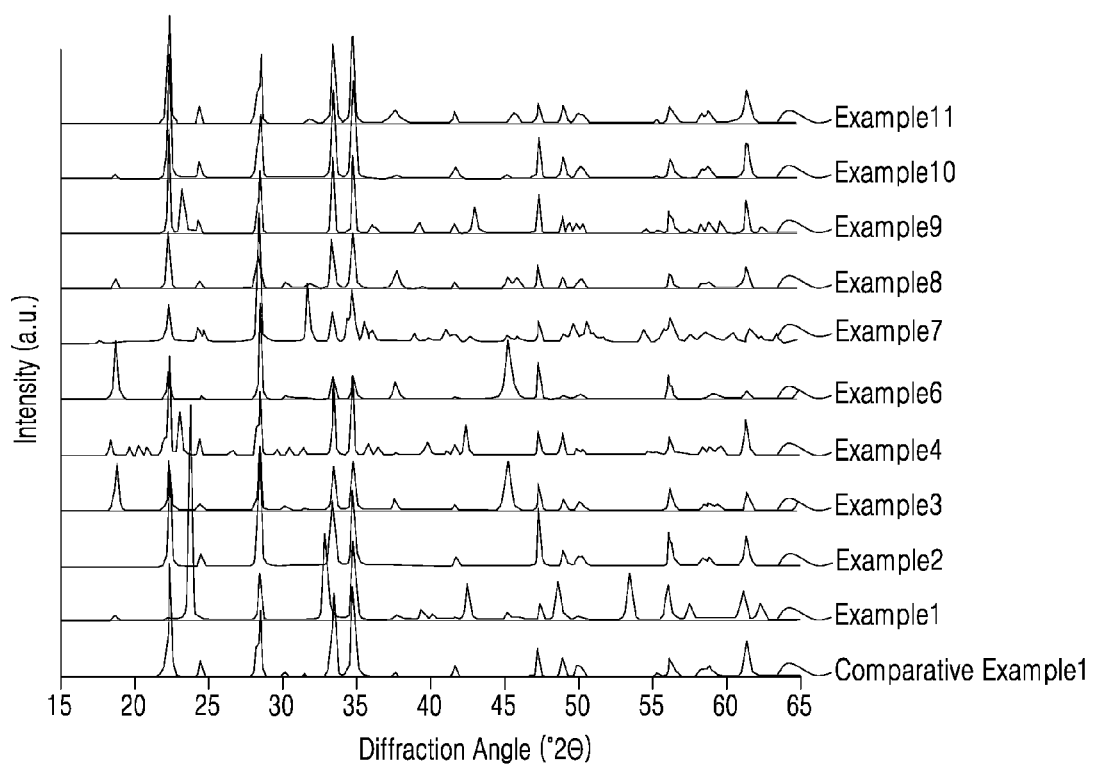
FIG. 2 is a graph of intensity in arbitrary units (a.u.) versus diffraction angle (°2θ) of the solid electrolytes of Comparative Example 1, Examples 1 to 4, and Examples 6 to 11, when analyzed by X-ray diffraction using Cu Kα radiation.

The solid electrolytes of Examples 1 to 11 and Comparative Example 1 were analyzed by X-ray diffraction (XRD), and the results thereof are shown in FIG. 2. XRD analysis was carried out using a D8 Advance instrument from Bruker Corporation, and Cu Kα radiation was used.

As shown in FIG. 2, it may be found that in an X-ray diffraction spectrum using CuKα, each of the solid electrolytes of Examples 1 to 11 has a first diffraction peak having a maximum point of about 22.3±1.0°2θ, a second diffraction peak having a maximum point of about 24.0±1.0°2θ, and a third diffraction peak having a maximum point of about 28.5±1.0°2θ.

Evaluation Example 2

Ion Conductivity

The upper end surface and lower end surface of each of the ion conductor pellets prepared Examples 1 to 11 and Comparative Example 1 were coated (deposited) with gold (Au) by sputtering, and impedance of each sample was measured by a 2-probe method using an impedance analyzer. The frequency range was 1 Hz to 1 MHz, and the amplitude voltage was 100 mV. The impedance of each samples was measured at 30° C. under an air atmosphere. Resistance values were obtained from the arc of the Nyquist plot for the impedance measurement results, and ion conductivity was calculated from the resistance values. The results of ion conductivity are shown in Table 1 and FIG. 3.

TABLE 1

| Example | Composition | Ion conductivity (mS/cm) |
|---|---|---|
| Comparative Example 1 | $LiAlO_2$ | $7.80 \times 10^{-7}$ |
| Example 1 | $Li_{0.8}Al_{0.9}Ta_{0.1}O_2$ | $7.22 \times 10^{-6}$ |
| Example 2 | $Li_{0.9}AlO_{1.9}F_{0.1}$ | $1.62 \times 10^{-6}$ |
| Example 3 | $Li_{0.95}AlO_{1.95}Cl_{0.05}$ | $1.45 \times 10^{-6}$ |
| Example 4 | $Li_{1.3}Al_{0.9}O_2$ | $1.18 \times 10^{-6}$ |
| Example 5 | $Li_{1.1}Al_{0.9}Zn_{0.1}O_2$ | $1.18 \times 10^{-6}$ |
| Example 6 | $Li_{0.9}AlO_{1.9}Cl_{0.1}$ | $1.13 \times 10^{-6}$ |

Figure 3:
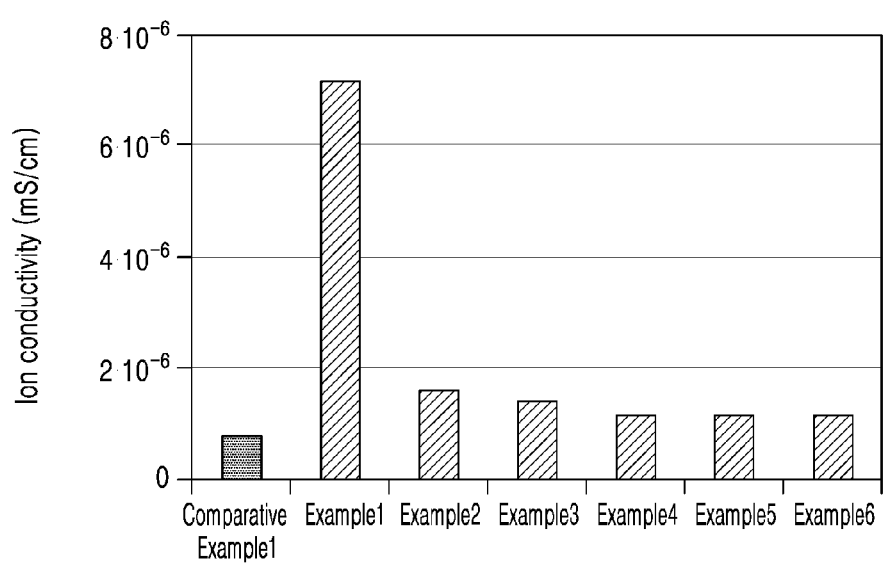
FIG. 3 is a graph illustrating the results of the ion conductivity in millisiemens per centimeter (mS/cm) of Comparative Example 1 and Examples 1 to 6.

As shown in Table 1 and FIG. 3, it was found that the solid electrolytes of Examples 1 to 6 had improved ion conductivity compared to the solid electrolyte of Comparative Example 1.

Evaluation Example 3

Evaluation of Electrochemical Stability

After each of the solid electrolytes of Examples 1 to 11 was pulverized to a size of about 1 μm. N-methyl-2-pyrrolidone was mixed with 85 wt % of the pulverized product, 10 wt % of carbon black as a conductive material, and 5 wt % of polyvinylidene fluoride (PVDF) as a binder to prepare a slurry, based on a total weight of the pulverized product, the conductive material, and the binder. The slurry was applied on an aluminum foil and then dried to prepare a working electrode. A lithium metal foil was used as a counter electrode, and a separator impregnated with a liquid electrolyte (1M lithium bis(trifluoromethanesulfonyl)imide (LiTFSI) in propylene carbonate (PC)) was disposed between the working electrode and the counter electrode to prepare a half-cell.

Electrochemical stability of layered compounds on lithium metals was evaluated over a voltage range of 2 V to 4 V (vs. Li) at a scan rate of 0.1 mV/sec by cyclic voltammetry.

The solid electrolyte of Example 1 was electrochemically stable without overcurrent due to side reactions during 1, 80, or 100 scans.

Evaluation Example 4

Evaluation of Charge and Discharge Characteristics of Lithium Air Battery

The lithium air batteries manufactured in Manufacture Examples 1 to 11 were discharged up to 2.0 V (vs. Li) with a constant current of 0.01 mA/cm² under an oxygen atmosphere of 60° C. and 1 atm, and then charged up to 4.25 V with the same current. This charge and discharge cycle was repeatedly performed. The charge and discharge test results of each of the lithium air batteries in the first cycle were examined.

The results of the charge and discharge test confirm that the lithium air batteries of Manufacture Examples 1 to 11, employing the solid electrolytes of Examples 1 to 11, were stable.

In the solid electrolyte, ion conductivity may be improved by providing a migration path for lithium ions by the introduction of element deficiencies and/or heterogeneous elements.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:
1. A solid electrolyte comprising:
an ion conductor represented by at least one of Formulae 1 to 3,

  Formula 1 wherein, in Formula 1,
M1 is a trivalent element, and
0<x<1;

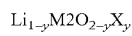  Formula 2 wherein, in Formula 2,
M2 is a trivalent element,
X is at least one of a halogen atom or pseudohalogen, and 0<y<1; and $$Li_{1-z(a-3)}M3_{1-z}D_zO_2 \qquad \text{Formula 3}$$

wherein, in Formula 3,
M3 is a trivalent element,
D is at least one of a monovalent element to a hexavalent element, a is an oxidation number of D, and 0<z<1.

2. The solid electrolyte of claim 1, wherein M1, M2, and M3 are each independently at least one of Al, Ga, In, Sc, Y, or La.

3. The solid electrolyte of claim 1, wherein X in Formula 2 is at least one of Cl, Br, F, cyanide, cyanate, thiocyanate, or azide.

4. The solid electrolyte of claim 1, wherein D in Formula 3 is at least one of Hf, Ta, Mg, Ca, Na, K, Cr, V, Fe, Cu, Zn, Zr, Sr, Sb, Y, Nb, Ga, Si, Sn, Mo, W, Ba, or a rare earth element.

5. The solid electrolyte of claim 1, wherein, in Formula 1, x is about 0.01 to about 0.5.

6. The solid electrolyte of claim 1, wherein, in Formula 2, y is about 0.01 to about 0.5.

7. The solid electrolyte of claim 1, wherein, in Formula 3, z is about 0.01 to about 0.5.

8. The solid electrolyte of claim 1, wherein the ion conductor is at least one of $Li_{1.15}Al_{0.95}O_2$, $Li_{1.3}Al_{0.9}O_2$, $Li_{1.6}Al_{0.8}O_2$, $Li_{1.9}Al_{0.7}O_2$, $Li_{0.99}AlO_{1.99}F_{0.01}$, $Li_{0.95}AlO_{1.95}F_{0.05}$, $Li_{0.9}AlO_{1.9}F_{0.1}$, $Li_{0.8}AlO_{1.8}F_{0.2}$, $Li_{0.7}AlO_{1.7}F_{0.3}$, $Li_{0.99}AlO_{1.99}Cl_{0.01}$, $Li_{0.95}AlO_{1.95}Cl_{0.05}$, $Li_{0.9}AlO_{1.9}Cl_{0.1}$, $Li_{0.8}AlO_{1.8}Cl_{0.2}$, $Li_{0.7}AlO_{1.7}Cl_{0.3}$, $Li_{0.99}AlO_{1.99}Br_{0.01}$, $Li_{0.95}AlO_{1.9}Br_{0.055}$, $Li_{0.9}AlO_{1.9}Br_{0.1}$, $Li_{0.8}AlO_{1.8}Br_{0.2}$, $Li_{0.7}AlO_{1.7}Br_{0.3}$, $Li_{0.9}Al_{0.9}Hf_{0.1}O_2$, $Li_{0.8}Al_{0.9}Ta_{0.1}O_2$, $Li_{1.1}Al_{0.9}Mg_{0.1}O_2$, or $Li_{1.1}Al_{0.9}Zn_{0.1}O_2$.

9. The solid electrolyte of claim 1, wherein the ion conductor has a tetragonal crystal structure.

10. The solid electrolyte of claim 1, wherein the ion conductor has an ion conductivity greater than an ion conductivity of $LiMO_2$, at 30° C.

11. The solid electrolyte of claim 1, wherein the solid electrolyte has an ion conductivity of about $1 \times 10^{-7}$ millisiemens per centimeter to about $1 \times 10^{-5}$ millisiemens per centimeter, after contacting a saturated lithium hydroxide solution, at 30° C.

12. The solid electrolyte of claim 1, wherein the solid electrolyte has an ion conductivity retention of about 50% to about 300%, after immersion in a saturated lithium hydroxide solution.

13. The solid electrolyte of claim 1, wherein, when analyzed by X-ray diffraction using CuKα radiation, the solid electrolyte has a first diffraction peak having a maximum at 22.3±1.0°2θ, a second diffraction peak having a maximum at 24.0±1.0°2θ, and a third diffraction peak having a maximum at 28.5±1.0°2θ.

14. The solid electrolyte of claim 1, wherein the solid electrolyte has an ion conductivity of about $1 \times 10^{-7}$ millisiemens per centimeter to about $8 \times 10^{-5}$ millisiemens per centimeter, at 30° C.

15. An electrochemical device comprising:
a cathode;
an anode; and
an electrolyte between the cathode and the anode,
wherein at least one of the cathode, the anode, or the electrolyte comprises the solid electrolyte of claim 1.

16. The electrochemical device of claim 15, wherein the electrochemical device is at least one of a battery, an accumulator, a supercapacitor, a fuel cell, a sensor, or an electrochromic device.

17. The electrochemical device of claim 16, wherein the electrochemical device is a lithium air battery, and wherein the electrolyte comprises the solid electrolyte of claim 1.

18. A method of preparing a solid electrolyte, the method comprising:
mixing a lithium precursor, at least one of an M1 precursor, an M2 precursor, or an M3 precursor, and optionally at least one of an X precursor or a D precursor, to prepare a precursor mixture; and
heat-treating the precursor mixture to prepare the solid electrolyte,
wherein the solid electrolyte is an ion conductor represented by at least one of
Formulae 1 to 3, $$Li_{1+3x}M1_{1-x}O_2 \qquad \text{Formula 1}$$

wherein, in Formula 1,
M1 is a trivalent element, and
0<x<1;

$$Li_{1-y}M2O_{2-y}X_y \qquad \text{Formula 2}$$

wherein, in Formula 2,
M2 is a trivalent element,
X is at least one of a halogen atom or pseudohalogen, and 0<y<1; and $$L_{1-z(a-3)}M3_{1-z}D_zO_2 \qquad \text{Formula 3}$$

wherein, in Formula 3,
M3 is a trivalent element,
D is at least one of a monovalent element to a hexavalent element,
a is an oxidation number of D, and
0<z<1.

19. The method of claim 18, wherein the method further comprises:
pulverizing the heat-treated precursor mixture to form a powder; and
heat-treating the powder to prepare the solid electrolyte.

20. The method of claim 19, wherein the heat-treating of the powder comprises heat-treating at a temperature greater than a temperature of the heat-treating of the precursor mixture.

21. The method of claim 19, wherein the heat-treating of the precursor mixture comprises heat-treating at a temperature of about 700° C. to about 1000° C., and the heat-treating of the powder is at a temperature of about 800° C. to about 1300° C.

* * * * *